(12) United States Patent
Blanton

(10) Patent No.: US 9,434,477 B2
(45) Date of Patent: Sep. 6, 2016

(54) DUCT APPARATUS FOR USE WITH AIRCRAFT AND RELATED METHODS

(71) Applicant: The Boeing Company, Chicago, IL (US)

(72) Inventor: Ross Mitchell Blanton, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 88 days.

(21) Appl. No.: 14/150,395

(22) Filed: Jan. 8, 2014

(65) Prior Publication Data

US 2015/0191253 A1 Jul. 9, 2015

(51) Int. Cl.
| F15D 1/04 | (2006.01) |
| F16L 9/00 | (2006.01) |
| B64D 33/04 | (2006.01) |
| F16L 25/12 | (2006.01) |
| F16L 25/14 | (2006.01) |

(52) U.S. Cl.
CPC ............... B64D 33/04 (2013.01); F16L 25/12 (2013.01); F16L 25/14 (2013.01); *Y10T 29/49826* (2015.01)

(58) Field of Classification Search
USPC ...................................... 138/37–39, 155–161
See application file for complete search history.

(56) References Cited

U.S. PATENT DOCUMENTS

| 915,086 | A | * | 3/1909 | Ferguson | 138/32 |
| 1,050,056 | A | * | 1/1913 | Dean | 138/158 |
| 1,593,628 | A | * | 7/1926 | Grabs | 285/419 |
| 2,275,572 | A | * | 3/1942 | Somers | F16L 23/14 138/163 |
| 2,674,297 | A | * | 4/1954 | Greenwald | 156/143 |
| 3,512,805 | A | * | 5/1970 | Glatz | F16L 9/003 138/166 |
| 4,084,066 | A | * | 4/1978 | Gillemot | 174/92 |
| 4,777,072 | A | * | 10/1988 | Cason, Jr. | B29C 61/10 138/128 |
| 4,780,347 | A | * | 10/1988 | Cohen | 428/34.2 |
| 4,861,946 | A | * | 8/1989 | Pichler et al. | 174/92 |
| 4,900,596 | A | * | 2/1990 | Peacock | 428/34.5 |
| 5,470,112 | A | | 11/1995 | Keating | |
| 5,647,358 | A | | 7/1997 | Vilasi | |
| 5,771,941 | A | * | 6/1998 | Almeida | 138/149 |
| 6,089,279 | A | * | 7/2000 | Clarke et al. | 138/157 |
| 6,543,489 | B1 | * | 4/2003 | Luce et al. | 138/156 |
| 7,210,505 | B2 | * | 5/2007 | Harpenau | 138/157 |
| 7,238,256 | B2 | * | 7/2007 | Skinner | F16L 9/22 138/155 |
| 2006/0207827 | A1 | | 9/2006 | Williams et al. | |

OTHER PUBLICATIONS

European Patent Office, "Extended European Search Report," issued in connection with European Patent Application No. 14183060.4, on May 22, 2015, 6 pages.

* cited by examiner

*Primary Examiner* — Paul R Durand
*Assistant Examiner* — Vishal Pancholi
(74) *Attorney, Agent, or Firm* — Hanley, Flight and Zimmerman, LLC

(57) ABSTRACT

Duct assembly apparatus for use with aircrafts and related methods are disclosed. An example apparatus includes a unitary ring and a duct having a longitudinal gap to define a first longitudinal edge and a second longitudinal edge. The first longitudinal edge moves relative to the second longitudinal edge to enable the unitary ring to be positioned over an outer surface of the duct. A splice strap overlaps the gap of the duct such that the splice strap fixes the first longitudinal edge relative to the second longitudinal edge when the unitary ring is positioned over the outer surface of the duct.

34 Claims, 6 Drawing Sheets

DUCT APPARATUS FOR USE WITH AIRCRAFT AND RELATED METHODS

FIELD OF THE DISCLOSURE

The present disclosure relates generally to aircraft and, more particularly, to duct apparatus for use with aircraft and related methods.

BACKGROUND

An exhaust system of an aircraft or jetliner typically employs a duct assembly to channel the exhaust gases from propulsion units (e.g., jet engines). In some examples, military and/or aerospace aircraft include duct assemblies having complex shapes or profiles. For example, a duct assembly for military and/or aerospace aircraft may employ an exhaust system that includes a waisted and/or tapered cross-section or profile along a direction of airflow within the duct assembly.

To form duct assemblies having complex shapes or profiles, the duct assemblies may be formed of a composite material such as, for example, a carbon/epoxy material. However, it may be difficult to form or fabricate a body composed of a composite material having an attachment such as, for example, a bolting flange. Thus, to attach a duct body composed of a composite material to interfacing components of an exhaust system annular end rings are often employed. The composite body may be attached to the end rings via, for example, fasteners. The end rings are often constructed of multiple segments (e.g., a two-piece split ring) to enable placement of the end rings adjacent an end of the duct body. In other words, the end rings may be provided in segments to enable attachment of the end rings about a perimeter of the duct body. However, employing multi-segment end rings increases manufacturing costs because they result in a higher part count and require fasteners, which increase the time needed to connect the end ring segments and reduces control of flatness (e.g., of bolting flanges of the annular end rings) due to dimensional variation caused by manufacturing tolerances.

SUMMARY

An example apparatus includes a unitary ring and a duct having a longitudinal gap to define a first longitudinal edge and a second longitudinal edge. The first longitudinal edge moves relative to the second longitudinal edge to enable the unitary ring to be positioned over an outer surface of the duct. A splice strap overlaps the gap of the duct such that the splice strap fixes the first longitudinal edge relative to the second longitudinal edge when the unitary ring is positioned over the outer surface of the duct.

Another example apparatus includes duct segments to be positioned between respective openings of end rings. The end rings are to attach a first end of the duct segments to an engine and a second end of the duct segments opposite the first end to a receptor. The example apparatus also includes splice straps to join the duct segments after the duct segments are positioned between the openings of the end rings.

An example method includes positioning a first duct and a second duct within respective openings of attachment rings, positioning a first longitudinal edge of the first duct away from a first longitudinal edge of the second duct to form a first gap between the first longitudinal edges, positioning a second longitudinal edge of the first duct away from a second longitudinal edge of the second duct to form a second gap between the second longitudinal edges, positioning a first splice strap to overlap the first longitudinal edges of the first and second ducts, and positioning a second splice strap to overlap the second longitudinal edges of the first and second ducts.

The features, functions and advantages that have been discussed can be achieved independently in various embodiments or may be combined in yet other embodiments, further details of which can be seen with reference to the following description and drawings.

Figure 1:
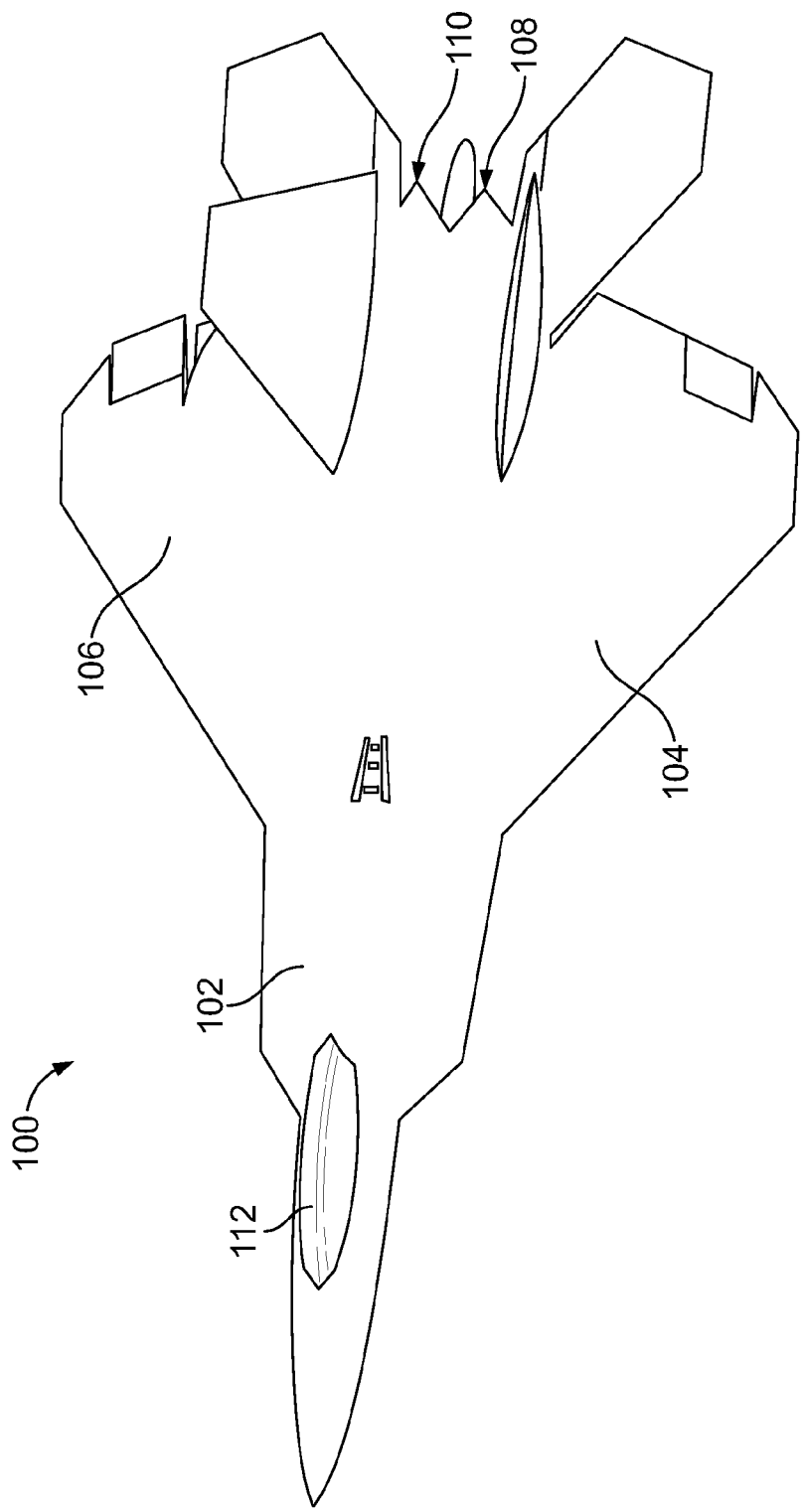
FIG. 1 is an illustration of an example aircraft that may embody aspects of the teachings disclosed herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Example duct apparatus and related methods disclosed herein may be used with aircraft such as, for example, military aircraft, aerospace aircraft and/or any other example aircraft or vehicles. The example duct apparatus may be used to implement an exhaust system of an aircraft. For example, the duct apparatus disclosed herein may define a portion of an exhaust path of an exhaust system of an aircraft. In some examples, the example duct apparatus disclosed herein may be coaxially aligned with another duct apparatus, an aircraft engine component, and/or any other aircraft component or system. In some examples, the duct apparatus disclosed herein may overlap or provide a sleeve over another duct of an exhaust system and/or any other aircraft component.

Unlike known duct apparatus, the example duct apparatus disclosed herein employs one-piece end rings to attach a duct to interfacing parts and/or other components of an exhaust system. Using end rings composed of unitary structures reduces procurement and assembly costs and improves dimensional and structural quality. The example end rings disclosed herein may be composed of metal, alloy(s), and/or any other suitable material(s).

To enable attachment of end rings formed as unitary structures to a duct, the example duct apparatus disclosed herein employs a duct that has a longitudinal split, gap or space (e.g., a variable sized gap) through the duct (e.g., in a direction between a first end and a second end of the duct through which fluid flows). For example, an example duct disclosed herein includes a slit to define a gap between a first longitudinal edge of the duct and a second longitudinal edge of the duct. In some examples, the first longitudinal edge may be positionable or movable relative to the second longitudinal edge to vary a size of the gap (e.g., a lateral distance between the first and second longitudinal edges). In some examples, the first longitudinal edge can flex toward, overlap, abut or contact the second longitudinal edge to eliminate the gap between the longitudinal edges. The longitudinal split or gap in the duct body defined by the first and second longitudinal edges enables a dimensional profile (e.g., a cross-section or a diameter) of the duct to be reduced or decreased to enable one or more of the end rings (e.g., a unitary end ring) to be positioned over an outer surface of the duct. Thus, the slit of the example duct disclosed herein enables the duct to vary (e.g., reduce) a distance of the gap between the longitudinal edges of the duct to enable the duct to be positioned through an opening of an end ring. An example duct disclosed herein may be composed of a composite material (e.g., carbon/epoxy) or other suitable material(s).

After end rings are positioned over the outer surface of the duct, the duct is expanded and attached to the end rings. In other words, the first and second longitudinal edges of the example duct disclosed herein are moved away from each other to enable the duct to increase a distance of the gap between the longitudinal edges after the duct is positioned through the openings of the end rings. Thus, an outer surface of the example duct disclosed herein has a first cross-sectional size (e.g., a first diameter or area) when the first longitudinal edge moves or flexes toward, abuts, overlaps or contacts the second longitudinal edge and a second cross-sectional size (e.g., a second diameter or area) when the first longitudinal edge is flexed, moved or spaced away from the second longitudinal edge, where the first cross-sectional size is smaller or less than the second cross-sectional size. Further, the first cross-sectional size is less than an opening (e.g., a diameter) of an end ring and the second cross-sectional size is greater than the opening of the end ring.

To cover or close the gap in the duct, an example splice strap, a connector or a joining member (e.g., a strip of composite material) disclosed herein may be positioned to overlap or contact the first and second longitudinal edges of the duct. The example splice strap disclosed herein fixes or couples the first and second longitudinal edges of the duct together. In some examples, a seal (e.g., a sealing agent) may be provided along a seam formed between the splice strap and the duct. The example splice strap may be attached to the duct and/or the end rings via, for example, mechanical fasteners, chemical fasteners, bonding and/or any other fastener(s) or process(es). In some examples, the splice strap contacts the duct and is coupled to the end rings via, for example, fasteners. The example splice strap disclosed herein may be composed of a material (e.g., a composite material such as a carbon/epoxy material) similar to the material of the duct and/or may be composed of a material different than the duct. In some examples, the splice strap may be composed of composite materials, metallic materials, alloys and/or any other suitable materials.

In some examples, a duct disclosed herein may be composed of a plurality of duct body portions or segments (e.g., duct body halves). A plurality of splice straps or joining members may be employed and positioned to cover or overlap any gaps or openings formed between the duct body portions after the end rings are positioned over outer surfaces of the respective duct body portions and longitudinal edges of the duct body portions are spaced away from each other.

Further, an example duct disclosed herein may have a tapered or waisted profile or cross-sectional shape that has an assembled cross-sectional size (e.g., a diameter or area) that is greater than a cross-sectional size (e.g., a diameter) of a smallest opening of an example end ring. Yet, although the cross-sectional size of the duct may be greater than the cross-sectional size of the smallest opening of the end ring when assembled, the duct may receive the end ring along an outer surface of the duct without interference when the cross-sectional size of the duct is reduced.

FIG. 1 illustrates an example aircraft 100 that may embody aspects of the teachings of this disclosure. The example aircraft of FIG. 1 is a fixed-wing aircraft for military applications. In the illustrated example, the aircraft 100 includes a fuselage 102, a first wing 104 and a second wing 106. A first engine 108 and a second engine 110 are disposed in the fuselage 102 aft of a canopy 112. However, the example aircraft 100 of FIG. 1 is merely an example and, thus, the example duct apparatus and methods disclosed herein may be implemented on other types of aircraft such as, for example, helicopters, commercial aircraft (e.g., passenger planes) and/or any other aircraft or vehicle(s).

Figure 2:
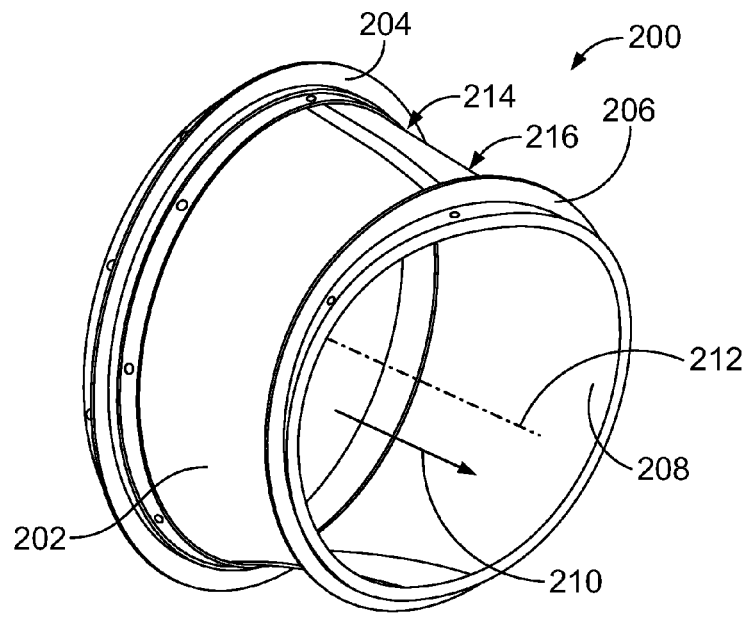
FIG. 2 illustrates an example duct apparatus for use with an aircraft or a vehicle that is constructed in accordance with the teachings disclosed herein.

FIG. 2 illustrates an example duct apparatus 200 constructed in accordance with the teachings disclosed herein. The duct apparatus 200 of the illustrated example includes a duct or duct body 202 positioned or captured between a first end ring 204 and a second end ring 206. Unlike some known attachment rings, the first and second end rings 204 and 206 are constructed as one-piece rings or unitary structures having a uniform profile. In the illustrated example, the duct 202 has an opening 208 that defines an airflow path 210 of the duct 202 along a longitudinal axis 212 of the duct 202. The first and second end rings 204 and 206 attach the duct 202 to an interface or component of a system. For example, the first end ring 204 may be configured to attach a first end 214 of the duct apparatus 200 or the duct 202 to an engine (e.g., the engine 108 of FIG. 1) and the second end ring 206 may be configured to attach a second end 216 of the duct apparatus 200 or the duct 202 to a receptor of an aircraft (e.g., the aircraft 100 of FIG. 1). In some examples, the duct apparatus 200 may be positioned in the fuselage 102 (FIG. 1) between the engines 108, 110 (FIG. 1) and an exhaust nozzle and/or the canopy 112 (FIG. 1). In some examples, the duct apparatus 200 may be coaxially aligned with another duct apparatus. In yet other examples, the duct apparatus 200 may overlap or slide over an outer surface of another duct of the aircraft 100.

Figure 3:
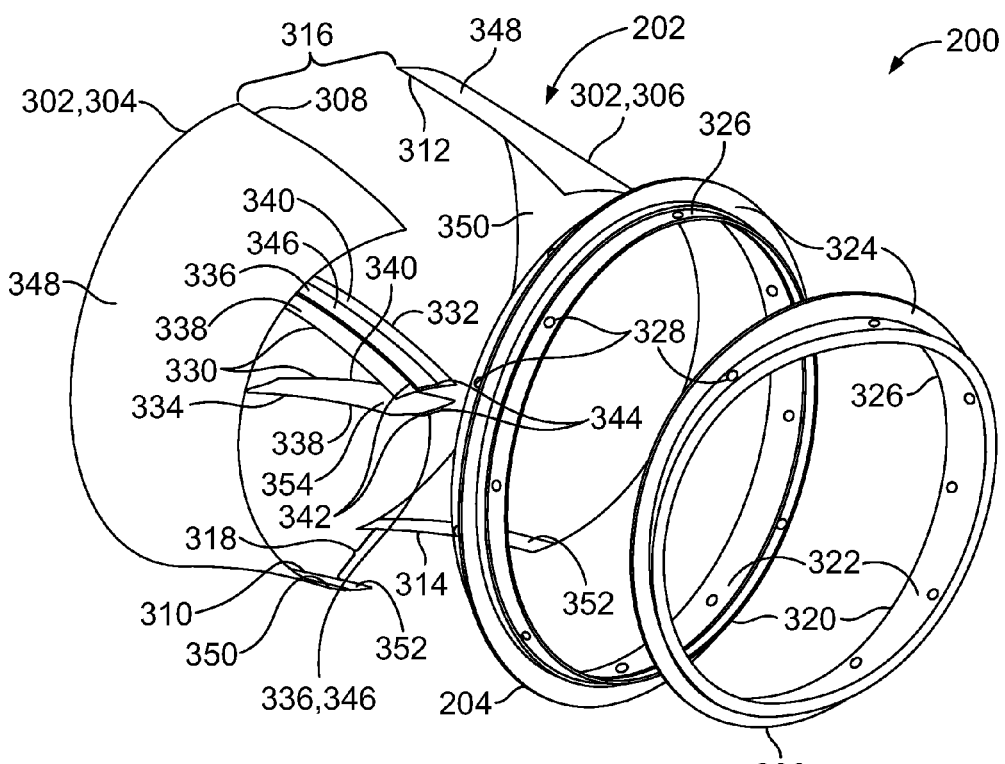
FIG. 3 illustrates an exploded view of the example duct apparatus of FIG. 2.

FIG. 3 illustrates an exploded view of the example duct apparatus 200 of FIG. 2. Referring to FIG. 3, the duct 202 of the illustrated example comprises a plurality of duct portions or segments 302. In the illustrated example, the duct 202 has a first duct segment 304 and a second duct segment 306. The first and second duct segments 304 and 306 define the airflow path 210 shown in FIG. 2. The first duct segment 304 of the illustrated example defines a first longitudinal edge 308 and a second longitudinal edge 310. Similarly, the second duct segment 306 of the illustrated example defines a third longitudinal edge 312 and a fourth longitudinal edge 314. As described in greater detail below, the first duct segment 304 is movable or positionable relative to the second duct segment 306 to vary a distance or gap 316 between the first and third longitudinal edges 308 and 312 and a distance or gap 318 between the second and fourth longitudinal edges 310 and 314 to enable positioning the first and second duct segments 304 and 306 between the first and second end rings 204 and 206 during assembly of the duct apparatus 200. The first and second duct segments 304 and 306 of the illustrated example are composed of a composite material such as, for example, a carbon/epoxy material. However, in other examples, the first and second duct segments 304 and 306 may be composed of any other suitable material(s). In some examples, the first and second duct segments 304 and 306 may be composed of different materials.

Each of the first and second end rings 204 and 206 has a unitary or one-piece body or profile 320 (e.g., a one-piece ring) defining an opening 322 and a first flange 324 adjacent a second flange 326. The first flange 324 of the illustrated example is a stiffener that adds structural integrity to the respective end rings 204 and 206. The first flange 324 of the illustrated example is substantially non-parallel relative to the second flange 326. For example, the second flange 326 of the illustrated example may be canted or angled relative to the first flange 324 and/or the longitudinal axis 212 (FIG. 2). Additionally, the first and second end rings 204 and 206 of the illustrated example include apertures 328 radially spaced relative to the longitudinal axis 212. In the illustrated example, the apertures 328 are provided on the body 320 of the first and second end rings 204 and 206 and are configured to receive fasteners to attach the respective first and second end rings 204 and 206 to an interface or component (e.g., of an exhaust system). The apertures 328 are also provided on the second flanges 326 of the respective first and second end rings 204 and 206 and are configured to receive fasteners to attach the first and second end rings 204 and 206 to the first and second duct segments 304 and 306. The first and second end rings 204 and 206 of the illustrated example are composed of metal. However, in other examples, the first and second end rings 204 and 206 may be composed of an alloy and/or any other suitable material(s).

To couple the first and second duct segments 304 and 306, the duct apparatus 200 of the illustrated example includes a plurality of splice straps 330. More specifically, the splice straps 330 of the illustrated example include a first splice strap 332 and a second splice strap 334. As described below, the splice straps 332 and 334 join or couple the first and second duct segments 304 and 306 after the first and second duct segments 304 and 306 are positioned between the openings 322 of the respective first and second end rings 204 and 206. In particular, the first splice strap 332 overlaps or covers the gap 316 and the second splice strap 334 overlaps or covers the gap 218. Thus, the first splice strap 332 joins or couples the first and third longitudinal edges 308 and 312 of the respective first and second duct segments 304 and 306 and the second splice strap 334 joins or couples the second and fourth longitudinal edges 310 and 314 of the respective first and second duct segments 304 and 306.

As shown in the illustrated example, to facilitate positioning the splice straps 332 and 334 relative to the first and second duct segments 304 and 306, each of the splice straps 332 and 334 includes a protrusion 336 that protrudes relative to a first portion or surface 338 (e.g., a first wing) of the respective splice straps 332 and 334 and a second portion or surface 340 (e.g., a second wing) of the respective splice straps 332 and 334. The protrusion 336 of the illustrated example defines a first edge 342 and a second edge 344 opposite the first edge 342. In this manner, the first longitudinal edge 308 of the first duct segment 304 abuts, contacts or engages the first edge 342 defined by the protrusion 336 of the first splice strap 332 and the third longitudinal edge 312 of the second duct segment 306 abuts, contacts or engages the second edge 344 defined by the protrusion 336 of the first splice strap 332. Similarly, the second splice strap 334 facilitates placement of the second and fourth longitudinal edges 310 and 314 of the first and second duct segments 304 and 306 via the first and second edges 342 and 344 defined by the protrusion 336. Further, when the splice straps 332 and 334 are coupled to the first and second duct segments 304 and 306, a surface 346 of the protrusion 336 is configured to be substantially flush with outer surfaces 348 of the respective first and second duct segments 304 and 306.

In addition, inner surfaces 350 of the first and second duct segments 304 and 306 may include recessed portions 352 (e.g., adjacent the longitudinal edges 308-314) to receive the first and second portions 338 and 340 of the respective splice straps 332 and 334. In this manner, a surface 354 of the respective splice straps 332 and 334 opposite the protrusion 336 may be substantially flush with the inner surfaces 350 of the first and second duct segments 304 and 306 when the splice straps 332 and 334 are coupled to the first and second duct segments 304 and 306. As a result, the splice straps 332 and 334 do not interfere with and/or alter a flow pattern of exhaust (or other fluid(s)) flowing through the opening 208 of the duct 202 (FIG. 2). However, in other examples, the splice straps 332 and 334 may not include the protrusion 336 and/or the splice straps 332 and 334 may not be flush relative to the outer surfaces 348 and/or the inner surfaces 350 of the respective first and second duct segments 304 and 306.

Figure 4:
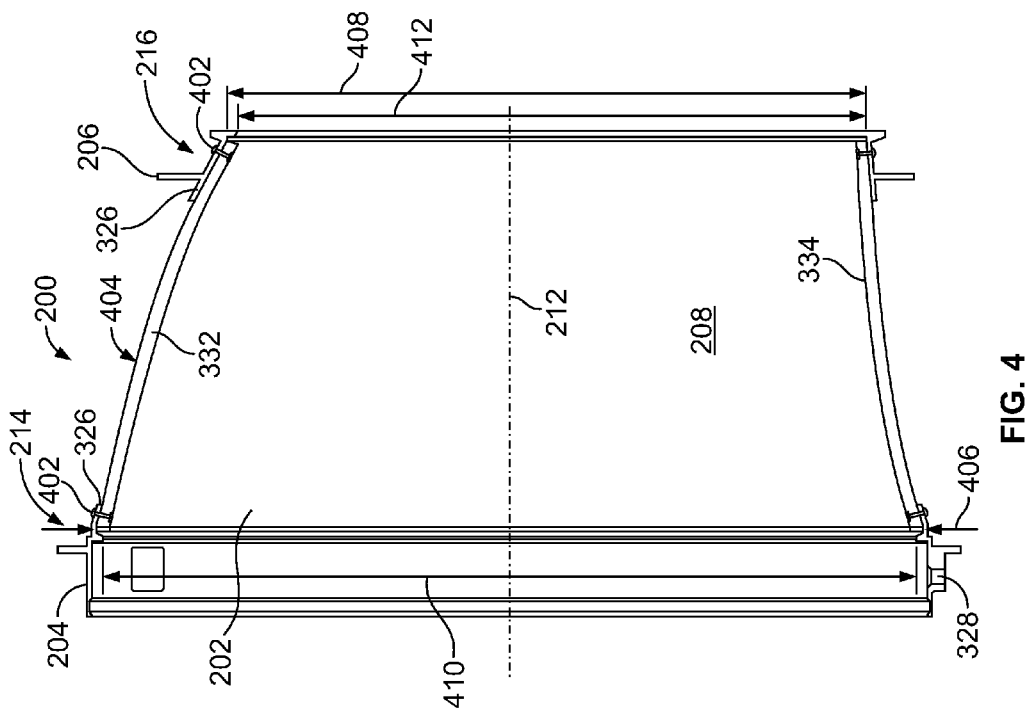
FIG. 4 illustrates a side view of the example duct apparatus of FIGS. 2 and 3.

FIG. 4 is a cross-sectional side view of the example duct apparatus 200 shown in FIGS. 2 and 3. As shown in FIG. 4, the splice straps 332 and 334 extend along the longitudinal axis 212 defined by the opening 208 of the duct 202 and are coupled to the first and second end rings 204 and 206 via fasteners 402. In some examples, the splice straps 332 and 334 may be captured between the respective longitudinal edges 308-314 of the first and second end rings 204 and 206 via friction fit or interference fit. In some examples, the first and second splice straps 332 and 334 may be coupled to the outer surfaces 348 of the first and second duct segments 304 and 306 via, for example, mechanical fasteners, chemical fasteners, bonding and/or any other suitable fastening mechanism(s) and/or process(es).

As shown in FIG. 4, the duct 202 of the illustrated example has a tapered profile 404. In particular, the first end 214 of the duct 202 defines an opening having a cross-sectional size 406 (e.g., a first diameter or area) that is greater than a cross-sectional size 408 (e.g., a second diameter or area) defined by an opening of the second end 216 of the duct 202. In addition, the cross-sectional size 406 of the first end 214 is greater than a cross-sectional size 410 (e.g., a diameter or area of a smallest opening) of the first end ring 204 and/or a cross-sectional size 412 (e.g., a diameter or area of the smallest opening) of the second end ring 206. The tapered profile 404 between the first and second ends 214 and 216 of the duct 202 may be curved, linear and/or any other suitable shape. In addition, the splice straps 332 and 334 of the illustrated example have a profile or shape that is substantially similar to a profile or shape of the outer surfaces 348 of the first and second duct segments 304 and 306 (i.e., an outer surface defined by the duct 202). Thus, the splice straps 332 and 334 of the illustrated example have a tapered profile or shape that is complementary to the tapered profile 406 provided by the outer surfaces 348 of the first and second duct segments 304 and 306. Additionally, the second flanges 326 of the respective first and second end rings 204 and 206 are angled or canted substantially similar to portions of the splice straps 332 and 334 and/or the outer surfaces 348 so that the second flanges 326 lie (e.g., flush) against or contact the outer surfaces 348 of the respective first and second duct segments 304 and 304 and/or the surfaces 346 of the respective splice straps 332 and 334.

Figure 5:
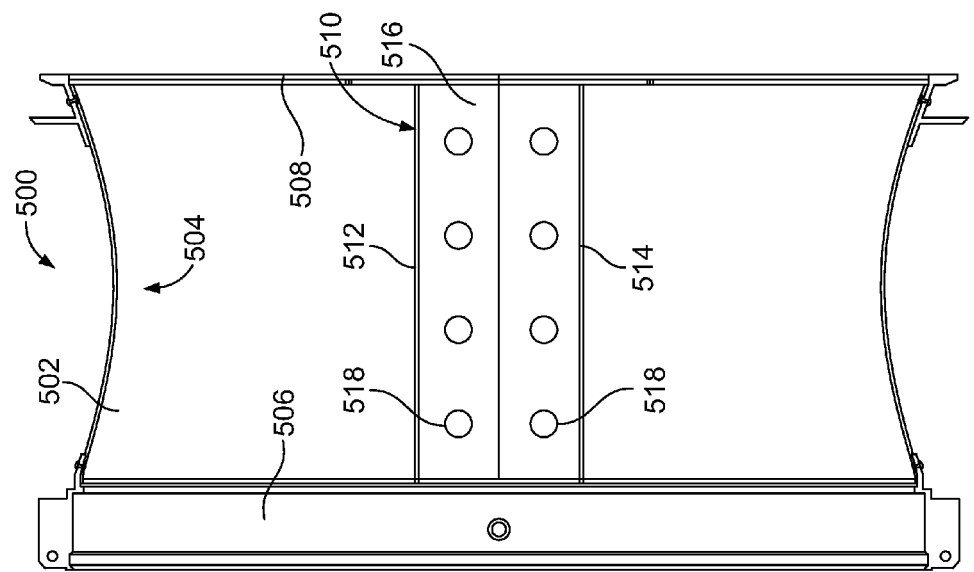
FIG. 5 illustrates a side view of another example duct apparatus constructed in accordance with the teachings disclosed herein.

In other examples, the duct 202 may have any other suitable profile or shape. For example, FIG. 5 illustrates an example duct apparatus 500 that includes a duct 502 having a waisted profile or shape 504 (e.g., a parabolic shape or profile) positioned between first and second end rings 506 and 508. In addition, the example duct 502 of FIG. 5 has only one gap 510 positioned between a first longitudinal edge 512 of the duct 502 and a second longitudinal edge 514 of the duct 502. A splice strap 516 couples the longitudinal edges 512 and 514 via fasteners 518. The splice strap 516 may also couple to the first and second end rings 506 and 508 via fasteners.

Figure 6:
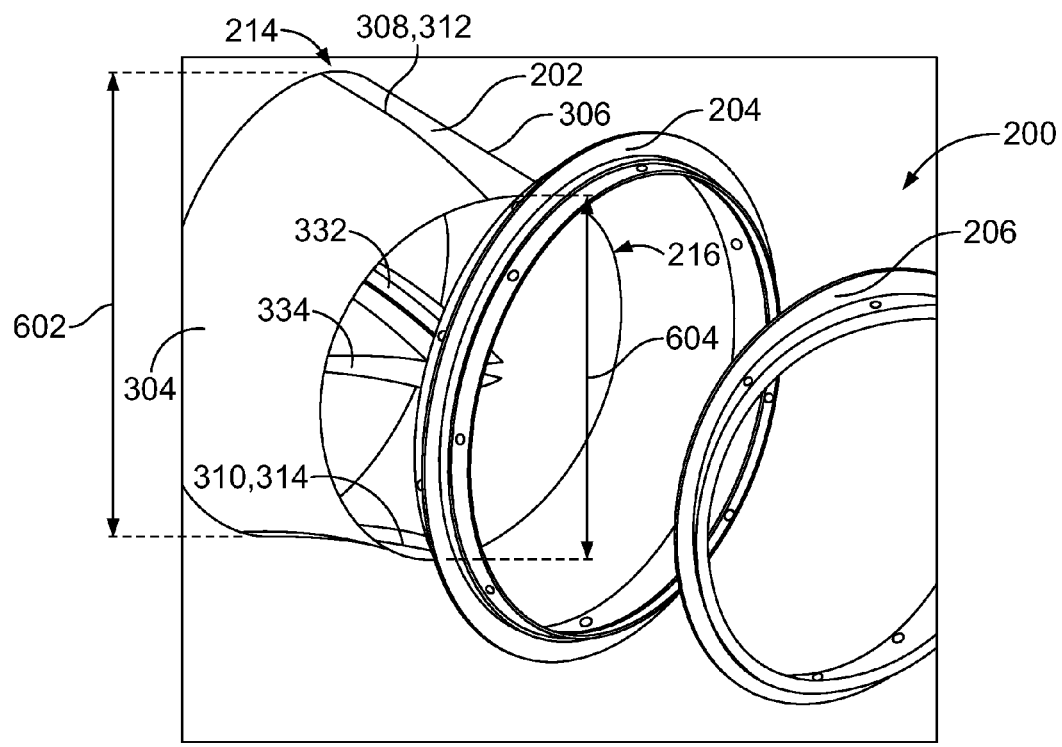
FIGS. 6-10 show partial assembly views illustrating an example method of assembling the example duct apparatus of FIGS. 2-4.

FIGS. 6-10 show partial assembly views illustrating an example method of assembling the example duct assembly of FIGS. 2-4 disclosed herein. Referring to FIG. 6, the first end ring 204 may be attached to a first interfacing component or engine of an aircraft and the second end ring 206 may be attached to a second interfacing component or receptor of an aircraft. The first end ring 204 and/or the second end ring 206 may be attached to respective interfacing components prior to or after the duct 202 is attached to the first and second end rings 204 and 206 and/or prior to or after the duct 202 is positioned through the openings 322 of the respective first and second end rings 204 and 206. To position the duct 202 through the respective openings 322 of the first and second end rings 204 and 206, the first and third longitudinal edges 308 and 312 and the second and fourth longitudinal edges 310 and 314 of the first and second duct segments 304 are positioned such that the first and third longitudinal edges 308 and 312 abut, contact or overlap each other and the second and fourth longitudinal edges 310 and 314 abut, contact or overlap each other. In this manner, the gaps 316 and 318 (FIG. 3) are reduced or eliminated to provide a cross-sectional size 602 (e.g., a diameter or area) at the first end 214 of the duct 202 and a cross-sectional size 604 (e.g., a diameter or area) at the second end 216 of the duct 202 that is different than (e.g., less than) the cross-sectional sizes 406 and 408, respectively, shown in FIG. 4. In other words, the cross-sectional sizes 602 and 604 are reduced when the splice straps 332 and 334 are decoupled from the first and second duct segments 304 and 306 and the first and third longitudinal edges 308 and 312 are in engagement and/or the second and fourth longitudinal edges 310 and 314 are in engagement.

Figure 7:
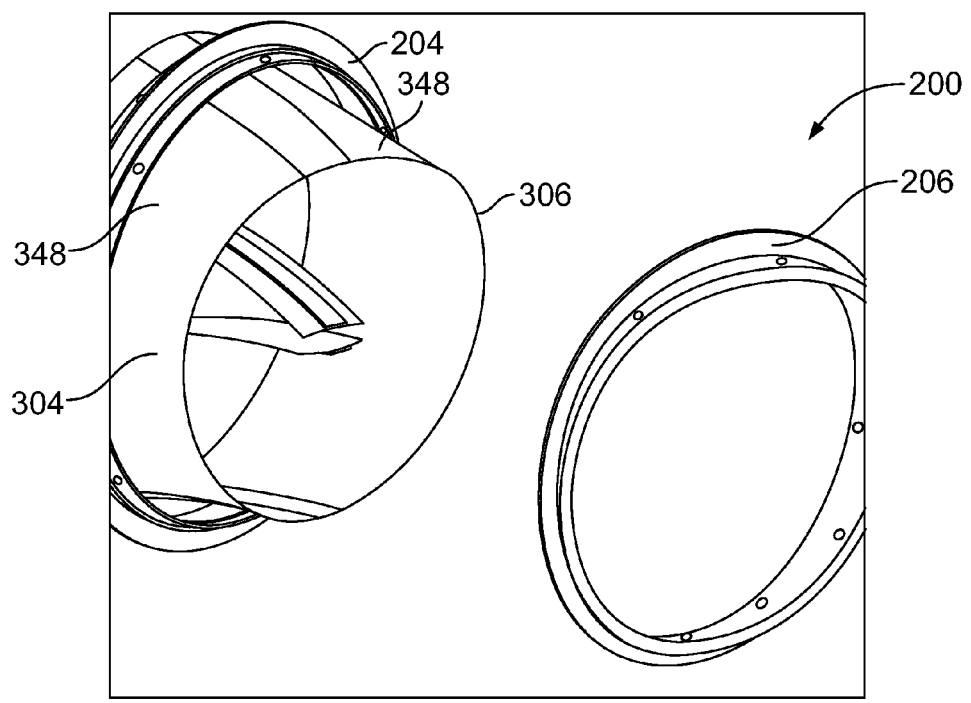

FIG. 7 illustrates the first end ring 204 being positioned over the outer surfaces 348 of the first and second duct segments 304 and 306 when the respective longitudinal edges 308-314 are in engagement. The cross-sectional size 416 (FIG. 4) of the first end ring 204 is greater than the cross-sectional sizes 602 and 604 of the duct 202 shown in FIGS. 6 and 7. Thus, the first end ring 204 slides over the outer surfaces 348 of the first and second duct segments 304 and 306 without interference.

Figure 8:
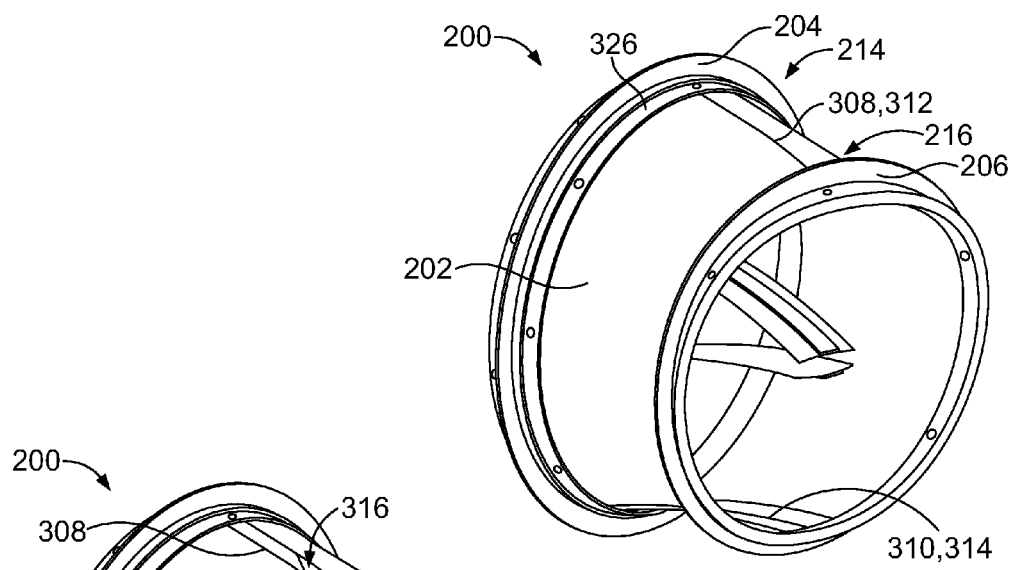

Referring to FIG. 8, with the respective longitudinal edges 308 and 312 and 310 and 314 of the first and second duct segments 304 and 306 abutting or overlapping each other, the first end 214 of the duct 202 is positioned adjacent (e.g., in abutting engagement with) the second flange 326 of the first end ring 204 and the second end 216 of the duct 202 is positioned adjacent (e.g., in abutting engagement with) the second flange 326 of the second end ring 206.

Figure 9:
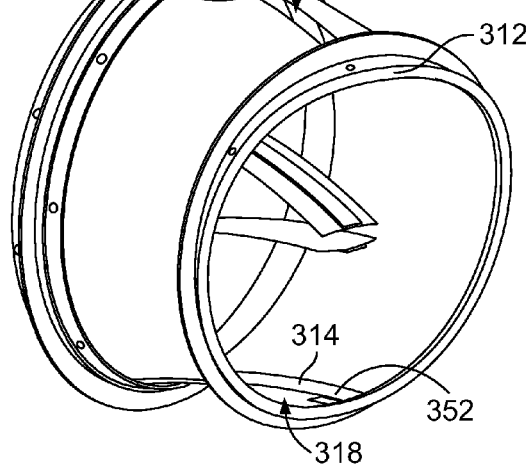

Referring to FIG. 9, after the first and second duct segments 304 and 306 are positioned between the first and second end rings 204 and 206, the longitudinal edges 308-312 of the respective first and second duct segments 304 and 306 are positioned away from each other. In other words, the first longitudinal edge 308 of the first duct segment 304 is positioned away from the third longitudinal edge 312 of the second duct segment 306 to form the gap 316. Likewise, the second longitudinal edge 310 of the first duct segment 304 is positioned away from the fourth longitudinal edge 314 of the second duct segment 306 to form the gap 318. In some examples, with the first and second duct segments 304 and 306 positioned away from each other to form the gaps 316 and 318, the first and second duct segments 304 and 306 may be coupled to the second flanges 326 of the respective first and second end rings 204 and 206 via, for example, fasteners.

Figure 10:
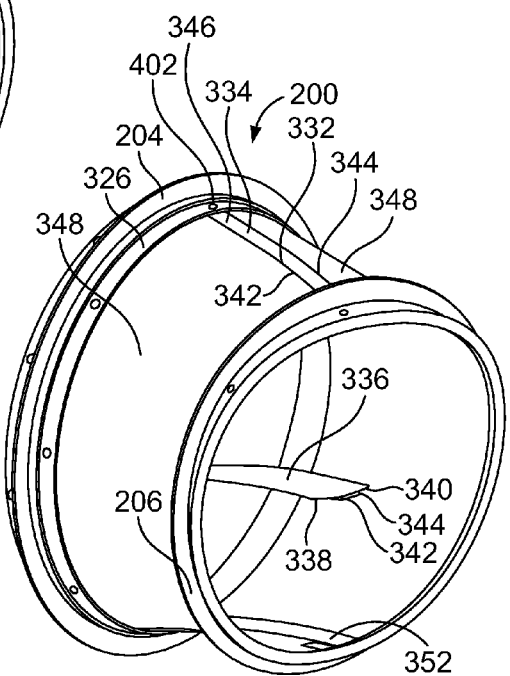

Referring to FIG. 10, the first splice strap 332 is positioned to overlap the first and third longitudinal edges 308 and 312 of the first and second duct segments 304 and 306 to cover the gap 316. In particular, the first and third longitudinal edges 308 and 312 engage or abut respective first and second edges 342 and 344 defined by the protrusion 336. In addition, the first portion 338 of the first splice strap 332 overlaps the recessed portion 352 of the first duct segment 304 and the second portion 340 of the first splice strap 332 overlaps the recessed portion 352 of the second duct segment 306. When coupled to the first and second duct segments 304 and 306, the surface 346 of the splice strap 332 is substantially flush or even with the respective outer surfaces 348 of the first and second duct segments 304 and 306. In the illustrated example, the first splice strap 332 is coupled to the respective second flanges 326 of the first and second end rings 204 and 206 via the fasteners 402. In some examples, a seal may be provided along the seams formed between the first splice strap 332 and the first and second duct segments 304 and 306 (e.g., along the first and second edges 342 and 344 formed by the protrusion 336). The second splice strap 334 is positioned to cover the gap 318 in a manner similar to the first splice strap 334 to provide the duct apparatus 200 shown in FIG. 2. For example, the second splice strap 334 is positioned over the gap 316 such that the second and fourth longitudinal edges 310 and 314 of the respective first and second duct segments 304 and 306 engage or abut the first and second edges 342 and 344 of the protrusion 336, respectively. Similarly, the first and second portions 338 and 340 and the second splice strap 334 engage the recessed portions 352 of the first and second duct segments 304 and 306, respectively, and the second splice strap 334 is coupled to the first and second end rings 204 and 206 via the fasteners 402.

In some examples, the apertures 328 may be formed in the end rings 204 and 206, the splice straps 332 and 334, and/or the first and second duct segments 304 and 306 prior to assembly (e.g., during formation of the end rings 204 and 206, the splice straps 332 and 334, and/or the first and second duct segments 304 and 306). In some examples, the apertures 328 may be formed in the end rings 204 and 206, the splice straps 332 and 334, and/or the first and second duct segments 304 and 306 during or at assembly of the duct apparatus 200. For example, the apertures 328 may not be in the end rings 204 and 206, the slice straps 332 and 334, and/or the first and second duct segments 304 and 306 prior to assembly of the duct apparatus 200. In some such instances, the apertures 328 may be formed (e.g., drilled via a tool) through the end rings 204 and 206, the splice straps 332 and 334, and/or the first and second duct segments 304 and 306 after the end rings 204 and 206, the splice straps 332 and 334 and/or the first and second duct segments 304 and 306 are positioned in their final assembled positions relative to each other. For example, the apertures 328 of the end rings 204 and 206 may be formed after the first and second duct segments 302 and 304 are positioned relative to the end rings 204 and 206 and either prior to or after the splice straps 332 and 334 are positioned relative to the first and second duct segments 304 and 306.

Figure 11:
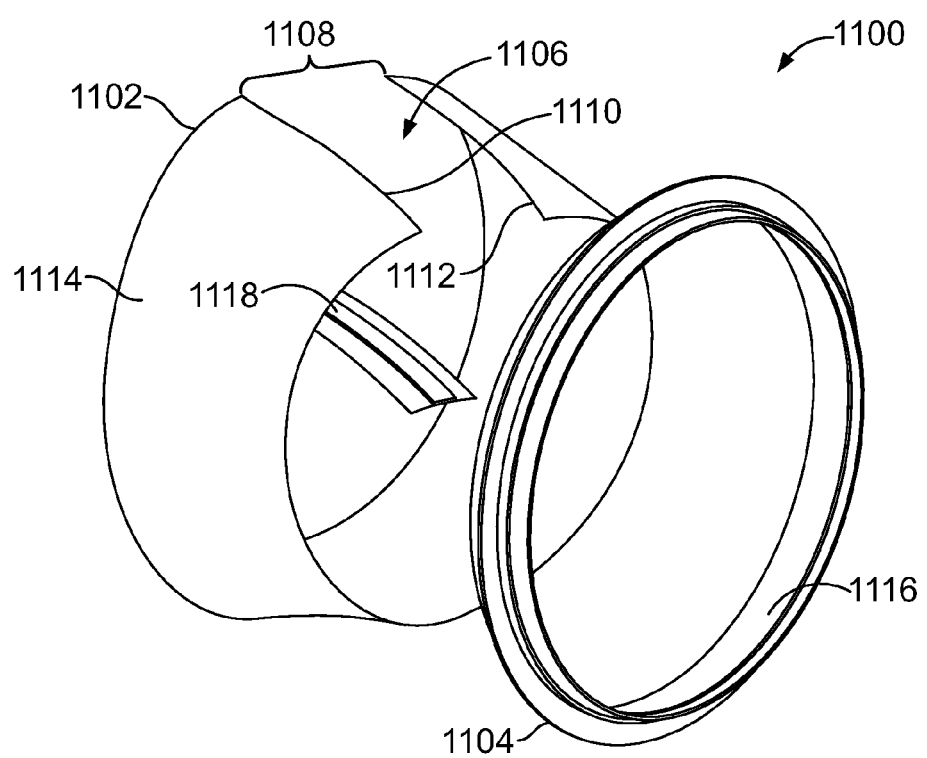
FIG. 11 illustrates another example duct apparatus for use with an aircraft or a vehicle that is constructed in accordance with the teachings disclosed herein.

FIG. 11 illustrates another example duct apparatus 1100 that includes a duct 1102 and a unitary end ring 1104. The end ring 1104 is a one-piece end ring (e.g., composed of metal or an alloy) that attaches the duct 1102 to an interfacing part and/or other component of an exhaust system or an aircraft or vehicle.

The duct 1102 of the illustrated example has a longitudinal slit or space 1106 (e.g., a variable sized gap) through the duct 1102. For example, the slit 1106 forms a gap 1108 between a first longitudinal edge 1110 of the duct 1102 and a second longitudinal edge 1112 of the duct 1102. The first longitudinal edge 1110 is positionable or movable relative to the second longitudinal edge 1112 to enable the unitary ring 1104 to be positioned over an outer surface 1114 of the duct 1102. In other words, the longitudinal edges 1110 and 1112 are positionable relative to each other to vary a size of the gap 1108 (e.g., a lateral distance between the first and second longitudinal edges 1110 and 1112). In some examples, the first longitudinal edge 1110 flexes toward the second longitudinal edge 1112 to reduce or eliminate the gap 1108 between the longitudinal edges 1110 and 1112. The duct 1102 of the illustrated example may be composed of a composite or flexible material to enable the first and second longitudinal edges 1110 and 1112 to move or flex toward each other. After the end ring 1104 is positioned over the outer surface 1114 of the duct 1102, the duct 1102 is expanded to increase a distance of the gap 1108 formed between the longitudinal edges 1110 and 1112.

Thus, the duct 1102 has a first cross-sectional size when the first longitudinal edge 1110 flexes toward, abuts or overlaps the second longitudinal edge 1112 and a second cross-sectional size when the first longitudinal edge 1110 is spaced away from the second longitudinal edge 1112. The first cross-sectional size is less than a cross-sectional size of the unitary ring 1104 and the second cross-sectional size is greater than the cross-sectional size of the unitary ring 1104. The slit 1106 enables the duct 1102 to reduce a distance of the gap 1108 between the longitudinal edges 1110 and 1112 to enable the duct 1102 to be positioned through an opening 1116 of the end ring 1104, and the slit 1106 enables the duct 1102 to increase the distance of the gap 1108 after the duct 1102 is positioned through the opening 1116 of the end ring 1104.

To cover or close the gap 1108 in the duct 1102, an example splice strap, a joining member or a connector 1118 (e.g., a strip of material) overlaps the gap 1108. The splice strap 1118 is positioned to overlap or contact the first and second longitudinal edges 1110 and 1112 of the duct 1102. For example, the splice strap 1118 fixes or couples the first longitudinal edge 1110 relative to second longitudinal edge 1112 of the duct 1102 when the unitary ring 1104 is positioned over the outer surface 1114 of the duct 1102. The splice strap 1118 may be composed of a material (e.g., a composite material such as a carbon/epoxy material) similar to the material of the duct 1102, composite materials, metallic materials, alloys and/or any other suitable materials.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a unitary ring having a fixed cross-sectional diameter;
a duct having a first longitudinal edge and a second longitudinal edge, the duct being positionable between a first position and a second position, the first longitudinal edge contacting or overlapping the second longitudinal edge when the duct is in the first position, the unitary ring being positioned over an outer surface of the duct when the duct is in the first position, the first longitudinal edge being spaced from the second longitudinal edge in a non-contacting and non-overlapping relationship when the duct is in the second position, the non-contacting and non-overlapping relationship defining a gap between the first and second longitudinal edges, the unitary ring being attached to the duct when the duct is in the second position; and
a splice strap attached to the duct when the duct is in the second position, the splice strap to cover the gap between the first and second longitudinal edges, the first longitudinal edge being in a fixed position relative to the second longitudinal edge when the splice strap is attached to the duct.

2. The apparatus of claim 1, wherein the unitary ring is attached to an interfacing component of an aircraft when the duct is in the second position.

3. The apparatus of claim 1, wherein the unitary ring is a first unitary ring, the apparatus further comprising a second unitary ring having a fixed cross-sectional diameter, the second unitary ring being positioned over the outer surface of the duct when the duct is in the first position, the second unitary ring being attached to the duct when the duct is in the second position.

4. The apparatus of claim 1, wherein the duct has a tapered profile when the splice strap is attached to the duct.

5. The apparatus of claim 4, wherein the tapered profile is defined by a first end of the duct and a second end of the duct opposite the first end, the first end having a first cross-section area, the second end having a second cross-sectional area, the first cross-sectional area being greater than the second cross-sectional area.

6. The apparatus of claim 4, wherein the unitary ring includes a first flange and a second flange positioned in a non-parallel relationship relative to the first flange, the second flange including a tapered profile that is complimentary to the tapered profile of the duct.

7. The apparatus of claim 1, wherein the splice strap includes a base and a protrusion extending in a non-parallel direction from the base, the protrusion having a first edge, a second edge opposite the first edge, and a first surface positioned between the first and second edges, the base having a second surface opposite the first surface of the protrusion.

8. The apparatus of claim 7, wherein the first longitudinal edge of the duct abuts the first edge of the protrusion and the second longitudinal edge of the duct abuts the second edge of the protrusion when the splice strap is attached to the duct.

9. The apparatus of claim 7, wherein the first surface of the protrusion is substantially flush with the outer surface of the duct when the splice strap is attached to the duct.

10. The apparatus of claim 7, wherein the second surface of the base is substantially flush with an inner surface of the duct when the splice strap is attached to the duct.

11. The apparatus of claim 10, wherein the inner surface of the duct includes a first recessed portion and a second recessed portion, the first and second recessed portions to receive the base of the splice strap when the splice strap is attached to the duct.

12. An apparatus comprising:
a unitary ring having a fixed cross-sectional diameter;
a duct having a first duct segment and a second duct segment, the first duct segment having a first longitudinal edge and a second longitudinal edge, the second duct segment having a third longitudinal edge and a fourth longitudinal edge, the first and second duct segments being positionable relative to one another between a first position and a second position, the first longitudinal edge contacting or overlapping the third longitudinal edge when the first and second duct segments are in the first position, the unitary ring being positioned over an outer surface of the first and second duct segments when the first and second duct segments are in the first position, the first longitudinal edge being spaced from the third longitudinal edge in a first non-contacting and non-overlapping relationship and the second longitudinal edge being spaced from the fourth longitudinal edge in a second non-contacting and non-overlapping relationship when the first and second duct segments are in the second position, the first non-contacting and non-overlapping relationship defining a first gap between the first and third longitudinal edges, the second non-contacting and non-overlapping relationship defining a second gap between the second and fourth longitudinal edges, the unitary ring being attached to the first and second duct segments when the first and second duct segments are in the second position;
a first splice strap attached to the first and second duct segments when the first and second duct segments are in the second position, the first splice strap to cover the first gap between the first and third longitudinal edges, the first longitudinal edge being in a fixed position relative to the third longitudinal edge when the first splice strap is attached to the first and second duct segments; and
a second splice strap attached to the third and fourth duct segments when the first and second duct segments are in the second position, the second splice strap to cover the second gap between the second and fourth longitudinal edges, the second longitudinal edge being in a fixed position relative to the fourth longitudinal edge when the second splice strap is attached to the first and second duct segments.

13. The apparatus of claim 12, wherein the unitary ring is attached to an interfacing component of an aircraft when the first and second duct segments are in the second position.

14. The apparatus of claim 12, wherein the unitary ring is a first unitary ring, the apparatus further comprising a second unitary ring having a fixed cross-sectional diameter, the second unitary ring being positioned over the outer surface of the first and second duct segments when the first and second duct segments are in the first position, the second unitary ring being attached to the first and second duct segments when the first and second duct segments are in the second position.

15. The apparatus of claim 12, wherein respective ones of the first and second duct segments have a tapered profile when the first and second splice straps are attached to the first and second duct segments.

16. The apparatus of claim 15, wherein the tapered profile is defined by a first end of the first and second duct segments and a second end of the first and second duct segments opposite the first end, the first end having a first cross-section area, the second end having a second cross-sectional area, the first cross-sectional area being greater than the second cross-sectional area.

17. The apparatus of claim 15, wherein the unitary ring includes a first flange and a second flange positioned in a non-parallel relationship relative to the first flange, the second flange including a tapered profile that is complimentary to the tapered profile of the respective ones of the first and second duct segments.

18. The apparatus of claim 12, wherein the first splice strap includes a base and a protrusion extending in a non-parallel direction from the base, the protrusion having a first edge, a second edge opposite the first edge, and a first surface positioned between the first and second edges, the base having a second surface opposite the first surface of the protrusion.

19. The apparatus of claim 18, wherein the first longitudinal edge of the first duct segment abuts the first edge of the protrusion and the third longitudinal edge of the second duct segment abuts the second edge of the protrusion when the first splice strap is attached to the first and second duct segments.

20. The apparatus of claim 18, wherein the first surface of the protrusion is substantially flush with the outer surface of the first and second duct segments when the first splice strap is attached to the first and second duct segments.

21. The apparatus of claim 18, wherein the second surface of the base is substantially flush with an inner surface of the first and second duct segments when the first splice strap is attached to the first and second duct segments.

22. The apparatus of claim 21, wherein the inner surface of the first and second duct segments includes a first recessed portion and a second recessed portion, the first and second recessed portions to receive the base of the first splice strap when the first splice strap is attached to the first and second duct segments.

23. A method for assembling a duct apparatus, the method comprising:
positioning a duct having a first longitudinal edge and a second longitudinal edge into a first position, the first longitudinal edge contacting or overlapping the second longitudinal edge when the duct is in the first position;
positioning a unitary ring having a fixed cross-sectional diameter over an outer surface of the duct when the duct is in the first position;
positioning the duct into a second position, the first longitudinal edge being spaced from the second longitudinal edge in a non-contacting and non-overlapping relationship when the duct is in the second position, the non-contacting and non-overlapping relationship defining a gap between the first and second longitudinal edges; and
attaching a splice strap to the duct when the duct is in the second position, the splice strap to cover the gap between the first and second longitudinal edges, the first longitudinal edge being in a fixed position relative to the second longitudinal edge when the splice strap is attached to the duct.

24. The method of claim 23, further comprising attaching the unitary ring to the duct when the duct is in the second position.

25. The method of claim 23, further comprising attaching the unitary ring to an interfacing component of an aircraft.

26. The method of claim 23, wherein the unitary ring is a first unitary ring, the method further comprising:
positioning a second unitary ring having a fixed cross-sectional diameter over the outer surface of the duct when the duct is in the first position; and
attaching the second unitary ring to the duct when the duct is in the second position.

27. The method of claim 23, wherein the duct has a tapered profile when the splice strap is attached to the duct.

28. The method of claim 27, wherein the tapered profile is defined by a first end of the duct and a second end of the duct opposite the first end, the first end having a first cross-section area, the second end having a second cross-sectional area, the first cross-sectional area being greater than the second cross-sectional area.

29. The method of claim 27, wherein the unitary ring includes a first flange and a second flange positioned in a non-parallel relationship relative to the first flange, the second flange including a tapered profile that is complimentary to the tapered profile of the duct.

30. The method of claim 23, wherein the splice strap includes a base and a protrusion extending in a non-parallel direction from the base, the protrusion having a first edge, a second edge opposite the first edge, and a first surface positioned between the first and second edges, the base having a second surface opposite the first surface of the protrusion.

31. The method of claim 30, wherein the first longitudinal edge of the duct abuts the first edge of the protrusion and the second longitudinal edge of the duct abuts the second edge of the protrusion when the splice strap is attached to the duct.

32. The method of claim 30, wherein the first surface of the protrusion is substantially flush with the outer surface of the duct when the splice strap is attached to the duct.

33. The method of claim 30, wherein the second surface of the base is substantially flush with an inner surface of the duct when the splice strap is attached to the duct.

34. The method of claim 33, wherein the inner surface of the duct includes a first recessed portion and a second recessed portion, the first and second recessed portions to receive the base of the splice strap when the splice strap is attached to the duct.

* * * * *